United States Patent [19]
Beck et al.

[11] 3,895,001
[45] July 15, 1975

[54] PROCESS FOR THE POLYMERISATION OF CYCLOALKENES

[75] Inventors: Manfred Beck, Odenthal-Globusch; Dieter Theisen, Remscheid, both of Germany

[73] Assignee: Bayer Aktiengesellschaft, Leverkusen-Bayerwerk, Germany

[22] Filed: Feb. 14, 1974

[21] Appl. No.: 442,643

Related U.S. Application Data

[63] Continuation of Ser. No. 244,288, April 14, 1972, abandoned.

[30] Foreign Application Priority Data

Apr. 17, 1971  Germany............................ 2118772

[52] U.S. Cl. ........ 260/93.1; 260/88.2 B; 260/88.2 F
[51] Int. Cl. .......................................... C08f 210/00
[58] Field of Search........... 260/93.1, 88.2 F, 88.2 B

[56] References Cited
UNITED STATES PATENTS

| | | | |
|---|---|---|---|
| 3,182,052 | 5/1965 | Naylor .............................. | 260/94.3 |
| 3,458,489 | 7/1969 | Natta et al. ......................... | 260/93.1 |
| 3,631,010 | 12/1971 | Witte et al. ..................... | 260/93.1 X |
| 3,692,760 | 9/1972 | Witte et al. ......................... | 260/93.1 |
| 3,776,895 | 12/1973 | Van der vem et al. ............ | 260/93.1 |
| 3,790,544 | 2/1974 | Maivtens et al. .................. | 260/93.1 |
| 3,798,175 | 3/1974 | Stveck et al..................... | 252/429 B |

*Primary Examiner*—William F. Hamrock
*Attorney, Agent, or Firm*—Connolly and Hutz

[57] ABSTRACT

Polymerisation of cycloalkenes wherein at least one cycloalkene having 4, 5, 7 or more carbon atoms and an olefinic double bond in the ring is polymerised in the presence of a catalyst consisting of
  a. a salt of molybdenum or tungsten,
  b. an organometallic compound or a halide of the Ist to IIIrd Main Group of the Periodic System of Element,
  c. molecular iodine and
  d. optionally a halogenated compound containing oxygen, as co-catalyst.

3 Claims, No Drawings

PROCESS FOR THE POLYMERISATION OF CYCLOALKENES

CROSS REFERENCE TO RELATED APPLICATION

This application is a continuation of application Ser. No. 244,288 filed Apr. 14, 1972 and now abandoned.

The polymerisation of cycloalkanes on catalysts of tungsten compounds and organometallic compounds yields polyalkenamers with very high molecular weight.

Products which have a broader molecular weight distribution and which can be more easily handled when preparing the mixture can be obtained by modifying the tungsten compound, e.g. by reacting $WCl_6$ with haloalkanols or halogenated acetals. High conversions are obtained with these modified catalysts only at polymerisation temperatures below 0°C, preferably at −10° to −20°C. Toluene is especially suitable for use as polymerisation solvent. Aliphatic hydrocarbons and benzene are not very suitable, due to their relatively high melting points. However using benzene or cyclohexanone instead of toluene would provide decisive advantages as the azeotropic mixtures of these solvents and water have a lower boiling point than the azeotropic mixture of toluene and water. Moreover if toluene is used as polymerisation solvent, larger quantities of water are required for coagulation than are required when using benzene or cyclohexane.

This invention relates to a process for the polymerisation of cycloalkenes, wherein at least one cycloalkene having 4, 5, 7 or more carbon atoms and an olefinic double bond in the ring is polymerised in the presence of a catalyst consisting of a. a salt of molybdenum or tungsten,
b. an organo compound or a halide of an element of groups I$a$ to III$a$ of the Periodic System of Elements,
c. molecular iodine and
d. if desired a halogenated compound containing oxygen as cocatalyst.

The invention also relates to the catalyst composition itself. Monomers suitable for polymerisation according to the invention are cyclic olefines having 4, 5 or 7 or more preferably up to 12 ring carbon atoms, e.g. cyclobutene, cyclopentene, cycloheptene, cyclooctene, cyclododecene or norbornene. These cyclic olefines may be homopolymerised or copolymerised with each other. They may also be copolymerised with other polymerisable unsaturated monomers, inter alia aliphatic dienes having e.g. 4 to 8 carbon atoms, such as butadiene-(1,3), 2-methylbutadiene-(1,3), isoprene and pentadiene-(1,3), alicyclic diolefines or triolefines such as norbornadiene, cyclooctadiene or cyclododecatriene or aliphatic monoolefines such as butene-1.

Salts of molybdenum or tungsten which are particularly suitable for the process according to the invention are halides, fluorides, chlorides, bromides, iodides), oxyhalides,(oxy-fluorides -chlorides, -bromides, -iodides) or interhalides of fluorine, chlorine, bromine or iodine, for example $MoF_6$, $MoF_5Cl$, $MoCl_5$, $MoCl_4$, $MoCl_3$, $MoCl_2$, $MoBr_4$, $MoBr_3$, $MoBr_2$, $MoI_4$, $MoI_3$, $MoI_2$, $MoOF_4$, $MoO_2F_2$, $Mo_2O_3Cl_6$, $MoOCl_4$, $MoOCl_3$, $MoO_2Cl_2$, $WF_6$, $WCl_6$, $WCl_5$, $WCl_4$, $WCl_2$, $WBr_6$, $WBr_5$, $WBr_4$, $WI_4$, $WI_2$, $WOF_4$, $WOCl_4$, $WO_2Cl_2$, $WOBr_4$, $WO_2Br_2$.

The activity of the catalyst is increased by reacting the molybdenum or tungsten salt with a halogenated compound which contains oxygen.

Suitable halogenated oxygen containing components are halogenated preferably chlorinated or brominated aliphatic (preferably $C_1$ to $C_6$) and cycloaliphatic (preferably $C_5$–$C_7$) alcohols, e.g. 2-chloroethanol, 2-bromo-cyclohexanol, 2,3-dichloropropanol, halogenated preferably chlorinated or brominated phenols having preferably 6 to 20 carbon atoms such as 2-bromophenol, 2-chloronaphthol-(1), acetals having the general formula $R_2C(OR')_2$ in which R represents hydrogen, a halogenated alkyl,(preferably $C_1$–$C_6$), aryl,(preferably having 6 to 20 carbon atoms) or alkyl aryl (compound of alkyl and aryl as defined previously) radical and R' represents a halogenated,(preferably chlorinated or brominated) alkyl, (preferably $C_1$ – $C_6$), aryl (preferably $C_6$ to $C_{20}$), aralkyl (composed of alkyl and aryl as defined) or alkylaryl (composed of alkyl and aryl as defined) radical, e.g. formal of β-chloroethanol, the acetal of β-chloroethanol chloraldimethylacetal, benzaldehyde diethylacetal, ethylene glycol formal; halogenated dialkyl ethers (halogen preferably chlorine or bromine, alkyl preferably $C_1$ – $C_6$) such as β,β'-dichloro-diethylether, 2-chloroethyl-ethylether; halogenated aliphatic aldehydes (halogen preferably chlorine or bromine, alkyl preferably $C_1$–$C_6$) such as chloral and 3-chloropropionaldehyde and halogenated aliphatic carboxylic acids (halogen preferably chlorine or bromine, alkyl preferably $C_1$ – $C_6$) for example chloroacetic acid and 3-chloropropionic acid and halogenated (preferably chlorinated or brominated) ketones (preferably aliphatic ketones having 1 to 6 carbon atoms in each alkyl) such as α-chloroacetone.

The quantity of halogenated oxygen-containing compound is from 0 to 3 mols per mol of molybdenum or tungsten salt.

Organo compounds or halides of groups Ia to IIIa of the Periodic System of Elements* are used as catalyst component b). Especially suitable among these compounds are the organometallic compounds of lithium, magnesium, zinc and aluminum having the respective formulae LiR, RMgX, $ZnR_2$ and $AlR_{3-n}X_n$ in which R represents an alkyl (preferably containing 1 to 20 carbon atoms), a cycloalkyl (preferably containing 3 to 8 carbon atoms), an aryl (preferably containing 6 to 20 carbon atoms) or an alkylaryl (combined from alkyl and aryl as defined). X is halogen such as fluorine, chlorine, bromine, iodine and $n$ is 0, 1, 2 or 3. Preferred are butyl lithium, zinc diethyl, aluminum trichloride, aluminum tribromide, ethyl aluminum dichloride, diethyl aluminum chloride, ethyl aluminum dibromide, di-n-propyl aluminum chloride, triethyl aluminum, triphenyl aluminum and di-tert.-butyl aluminium chloride.

*Handbook of Chemistry and Physics 47 Edition (1966) page B-3 Chemical Rubber Comp. Cleveland, Ohio.

The process may be carried out with or without a solvent. Suitable solvents are aliphatic or alicyclic hydrocarbons having 5 to 12 carbon atoms, e.g. pentane, heptane, gasoline fractions boiling at 60° to 200°C, aromatic hydrocarbons such as benzene, xylene and toluene and halogenated aliphatic or aromatic hydrocarbons, e.g. chlorobenzene or mixtures of the above mentioned solvents.

The concentration of the monomer solutions is preferably from 10 to 30% by weight, most preferably 15 to 30% by weight.

The quantity of molybdenum or tungsten salt (a) is generally 0.01 to 10 mmol, preferably 0.1 to 1 mmol, per 100 g of monomer.

The molar ratio of b:a is from 1:1 to 7:1. The molar ratio of a:c is generally from 100:1 to 1:10, preferably from 2:1 to 1:2.

In one way of carrying out the process of the invention, a solution of the monomer or monomers in one of the above-described solvents is introduced into a reaction vessel and the catalyst components are added optionally after being dissolved in the polymerisation solvent. The sequence in which the catalyst components are added is immaterial but it is preferred to add first constituent (a) or its reaction product with (d) and the iodine and then constituent (b). In another way of carrying out the process the catalyst is first made up (preformed) and then the monomer is added (optionally as a solution).

Polymerisation can generally be effected at temperatures of from −60° to +50°C, it is however preferred to operate at +5° to +35°C.

Polymerisation is carried out with exclusion of water but it has been found that very small quantities of water have a positive effect on the reaction, e.g. yields are increased by increasing the water content from 2 ppm to 5 ppm. The water content of the polymerising mixture may be from 0 to 40 ppm.

When polymerisation has been completed, the catalyst may be inactivated by the addition of water, alcohols such as methanol, ethanol or isopropanol or organic acids such as formic acid or stearic acid.

To prevent significant quantities of the metals of the catalyst system from remaining in the polymer material it is advisable to add chelate-forming compounds such as ethanolamine, N-methylethanolamine, ethylenediamine. The polymers may be stabilised against the action of oxygen by the addition of known antioxidants such as 2,6-di-tert.-butyl-4-methyl-phenol, 2,2'-dihydroxy-3,3'-di-tert.-butyl-5,5'-dimethyl-diphenylmethane or phenyl-β-naphthylamine. The process may be carried out either intermittently or continuously.

The polymers may be precipitated from their solutions by the usual methods involving the addition of non-solvents such as lower alcohols, e.g. methanol or ethanol. For technical purposes it is preferred to isolate the polymer by introducing the inactivated and stabilised polymer solution into hot water, the solvent and water then distilling off as an azeotropic mixture. The polymer is obtained in the form of lumps. The polymer lumps still moist with water may be dried in a drying chamber, on a belt drier or in a screw.

The catalyst according to the invention yields very high conversions at temperatures above 0°C. In addition, thermal energy is saved in the recovery by stripping when low boiling benzene or cyclohexane is used as a solvent. These solvents solidify at +5°C and 6.5°C respectively, and cannot be used together with conventional catalysts which have to be operated at lower temperatures (below 0°C). Thus the use of, for example, benzene instead of toluene lowers considerably the energy required for isolating the polymer in a continuous process owing to the more advantageous composition of the solvent/water azeotrop.

The polymers obtained with the iodine containing catalyst are very easy to process and they exhibit high tack, low cold flow and surprisingly high green strength. The polymers constitute vulcanisable synthetic rubber and can be used for any purposes for which rubber is used, e.g. in the manufacture of rubber articles and automobile tires.

EXAMPLE 1

The following examples illustrate i.a. the influence of iodine on conversion.

350 ml of a solution of cyclopentene in anhydrous toluene (concentration see Table 1) are introduced into 400 ml pressure flasks. The quantities of tungsten compound (0.1 molar solution in toluene of the reaction product of $WCl_6$ and chloroethanol in a molar ratio 1:1.8) and iodine (0.05 molar solution in toluene) indicated in Table 1 were added successively at room temperature. After cooling to the starting temperature, the polymerisation was initiated with the indicated quantity of $Al(C_2H_5)_2Cl$. (0.37 molar solution in toluene). The temperature rose to about 30°C. Polymerisation was stopped after 3 hours by the addition of 2 g of di-tert.-butylcresol and 0.88 of ethylenediamine (dissolved in 5.0 ml of toluene). The polymer was precipitated with methanol, filtered off and dried in a vacuum at 50°C.

Table 1

| No. | iodine mmol/100 g of monomer | Concentration of cyclopentene solution in toluene % by weight | Starting Temperature | Tungsten compound mmol/100g monomer | Molar ratio Al/W | Conversion % |
|---|---|---|---|---|---|---|
| 1a | 0.1 | 16 | +10° | 0.35 | 3.0 | 51.7 |
| 1b | none | 16 | +10° | 0.35 | 3.0 | 41.8 |
| 1c | 0.1 | 25 | +10° | 0.35 | 3.0 | 63.2 |
| 1d | none | 25 | +10° | 0.35 | 3.0 | 53.1 |
| 1e | 0.1 | 20 | +15° | 0.20 | 3.0 | 61.8 |
| 1f | none | 20 | +15° | 0.20 | 3.0 | 40.0 |

The presence of iodine increases the yield by up to 20%.

EXAMPLE 2

The following examples i.a. illustrate the influence of small quantities of water in the presence of iodine. 1200 ml of anhydrous toluene were mixed with 260 g of cyclopentene in a 2-litre glass autoclave and the water content (see Table 2) was adjusted by the addition of moist toluene. The tungsten compound and iodine solution of example 1 were added successively in the quantities specified in table 2 and the temperature was adjusted to +15°C. After activation with the $Al(C_2H_5)_2Cl$ solution of example 1 in the quantities given in table 2, polymerisation set in at once; the temperature rose to 34°C. The polymerisation time was 3 hours without cooling. The polymerisation was stopped by the addition of 2 g of di-tert.-butyl cresol and 0.8 g of ethylenediamine dissolved in 50 ml of methanol. The polymer was isolated by precipitation with methanol, Table 2

| No. | Tungsten compound mmol/100g monomer | Molar ratio Al/W | Iodine mmol/ 100g monomer | Water content ppm | Monomer concentration % by weight | Conversion % | Defo hardness | Defo-elasticity |
| --- | --- | --- | --- | --- | --- | --- | --- | --- |
| 2a | 0.2 | 3.0 | 0.1 | 2 | 20% | 62.0 | 1200 | 15 |
| 2b | 0.2 | 3.0 | 0.1 | 5 | 20% | 64.2 | 1250 | 16 |
| 2c | 0.2 | 3.0 | 0.1 | 2 | 30% | 65.9 | 2300 | 19 |
| 2d | 0.2 | 3.0 | 0.1 | 5 | 30% | 67.3 | 2150 | 24 | filtered off and dried in a vacuum at 50°C.

The increase in water content in the presence of iodine results in a further improvement in yield.

EXAMPLE 3

1200 ml of anhydrous benzene were introduced into a 2-litre glass autoclave and 260 g of cyclopentene were added. Polymerisation was carried out exactly as in example 2, but with no adding of water. 161 g of polymer were obtained, corresponding to a yield of 63% intrinsic viscosity [ ] in toluene at 25°C = 3.47. Defo hardness/elasticity 1325/11.

EXAMPLE 4

General procedure was as in example 2, 1500 ml of a 25% by weight solution of cyclopentene in dry toluene were placed in a 2-litre autoclave. 0.35 mmols per 100 g monomer of the reaction product of tungsten hexachloride and $CH_2(OCH_2CH_2Cl)_2$ in a molar ratio of 1:1 were added as a solution in toluene. Subsequently 0.1 mmols of iodine per 100 g of monomer were added (as a toluene solution) and the mixture was activated by adding a toluene solution of $Al(C_2H_5)_2Cl$ in an amount to establish an Al/W molar ratio of 3.0. Polymerisation and recovery were as in example 2. Polymer yield : 60.4% of the theoretical Mooney-viscosity ML4'(100°C) : 90; Defo hardness/Defoelasticity 675/17.

EXAMPLE 5

This example illustrates the use of cyclohexane as solvent. The experiments described in Table 3 were carried out as described in example 2 but using cyclohexane as a solvent. Considerably lower yields are obtained in the comparison example (without the addition of iodine, Example 5d).

A vulcanisable rubber mixture of the composition indicated below was prepared on a roller mill from the polymer of Example 5c.

| Composition of rubber mixture | Parts by weight |
| --- | --- |
| trans-Polypentenamer | 100 |
| ISAF carbon black | 75 |
| High aromatic extender oil (naphtholene MV) | 45 |
| ZnO | 0.5 |

—Continued

| Composition of rubber mixture | Parts by weight |
| --- | --- |
| Stearic acid | 0.5 |
| N-phenyl-N-isopropyl-p-phenylenediamine | 1 |
| Phenyl-α-naphthylamine | 1 |
| Benzothiazyl-cyclohexylsulphonamide (Vulkacit CZ) | 0.5 |
| Sulphur | 2 |

The processing ease on the rollers was given the assessment 2 on a scale of 1 - 6 (very good - unsatisfactory). The unvulcanised mixture had the following physical data:

| Green strength | 58 kg at 710% elongation |
| --- | --- |
| Tack | 80 ounces*) |
| Cold flow | 0 |

*)Tack meter Tel-Tak TM 1969 of Monsanto.

Vulcanisates obtained at 150°C (20 minutes heating) had the following properties:

| Tensile strength (DIN 53 504) | 211 kg/cm² |
| --- | --- |
| Modulus at 300% elongation | 100 kg/cm² |
| Elasticity (DIN 53572) | 51% |
| Shore A hardness (DIN 53 505) | 60 |

EXAMPLE 6

40 g of cyclopentene were introduced into a pressure flask. At 20°C $WCl_6$ was added as a toluene solution in an amount of 0.2 mmol W per 100 g of monomer and aluminium bromide was added in an amount of 1.0 mmol Al per 100 g of monomer, followed by iodine as a toluene solution in an amount of 0.2 mmol $I_2$ per 100 g of monomer. For comparison, the same reaction mixture was prepared but without the addition of iodine.

Table 3

| No. | Tungsten compound mMol per 100 g monomer | Molar ratio Al/W | Iodine mmol/ 100 g monomer | Monomer concentration | Starting temperature | Conversion % |
| --- | --- | --- | --- | --- | --- | --- |
| 5a | 0.2 | 3.0 | 0.1 | 20% | +15°C | 51.4 |
| 5b | 0.2 | 2.8 | 0.1 | 25% | +15°C | 61.6 |
| 5c | 0.2 | 2.5 | 0.1 | 25% | +15°C | 33.7 |
| 5d | 0.2 | 3.0 | none | 20% | +15°C | 33.7 |

After the reaction mixtures had been left to stand at 20°C for 15 hours, they were processed as in Example 2. The polymer yield obtained from the reaction mixture containing iodine was 49.0% and that obtained from the comparison mixture without iodine was 41.2%.

We claim:

1. In the process of polymerizing at least one cycloalkene having 4, 5, 7 or more carbon atoms and an olefinic double bond in the ring in which the said cycloalkenes are polymerized in the presence of from 0 to 40 ppm of water and in the presence of a catalyst containing a salt of molybdenum or tungsten and an organo compound or halide of an element of Groups Ia to IIIa of the Periodic System, the improvement wherein said catalyst comprises a. 0.01 to 10 mmol per 100 g of monomer of a halide, oxyhalide or interhalide of molybdenum or tungsten, b. a compound of the formula LiR, RMgX, $ZnR_2$ or $AlR_{3-n}X_n$ wherein R is alkyl having 1 to 20 carbon atoms, cycloalkyl having 3 to 8 carbon atoms, aryl having 6 to 20 carbon atoms or alkylaryl wherein alkyl contains from 1 to 20 carbon atoms and aryl contains from 6 to 20 carbon atoms, X is halogen and n is 0, 1, 2 or 3, and c. molecular iodine, the molar ratio of b):a) being from 1:1 to 7:1 and the molar ratio of a):c) being from 100:1 to 1:10.

2. The process as claimed in claim 1 wherein the catalyst also includes up to 3 mols of a halogenated oxygen-containing compound, per mol of a), said halogenated oxygen-containing compound being a halogenated aliphatic alcohol having 1 to 6 carbon atoms, a halogenated cycloaliphatic alcohol having 5 to 7 carbon atoms, a halogenated phenol, an acetal having the formula $R_2C(OR')_2$ wherein R is hydrogen or halogenated alkyl having 1 to 6 carbon atoms, halogenated aryl having 6 to 20 carbon atoms or halogenated alkaryl having 1 to 6 carbon atoms in the alkyl moiety and 6 to 20 carbon atoms in the aryl moiety and R' is halogenated alkyl having 1 to 6 carbon atoms, halogenated aryl having 6 to 20 carbon atoms, halogenated aralkyl or halogenated alkaryl wherein the alkyl moiety has from 1 to 6 carbon atoms and the aryl moiety has from 6 to 20 carbon atoms, a halogenated dialkyl ether having from 1 to 6 carbon atoms in each alkyl moiety, a halogenated aliphatic carboxylic acid having from 1 to 6 carbon atoms or a halogenated dialkyl ketone having from 1 to 6 carbon atoms in each alkyl moiety.

3. The process as claimed in claim 1 wherein the polymerization is carried out in the presence of a solvent.

* * * * *